US011792027B2

(12) United States Patent
Frezza et al.

(10) Patent No.: US 11,792,027 B2
(45) Date of Patent: Oct. 17, 2023

(54) SYSTEM AND METHOD FOR POWER OVER ETHERNET CONTROL

(71) Applicant: Molex, LLC, Lisle, IL (US)

(72) Inventors: Giovanni Frezza, Buffalo Grove, IL (US); Christopher Blount, Naperville, IL (US); Michael C. Picini, Aurora, IL (US); Mohammed Alhroub, Orland Park, IL (US); Anthony Mackey, Downers Grove, IL (US)

(73) Assignee: MOLEX, LLC, Lisle, IL (US)

( * ) Notice: Subject to any disclaimer, the term of this patent is extended or adjusted under 35 U.S.C. 154(b) by 171 days.

(21) Appl. No.: 16/081,781

(22) PCT Filed: Feb. 15, 2017

(86) PCT No.: PCT/US2017/017885
§ 371 (c)(1),
(2) Date: Aug. 31, 2018

(87) PCT Pub. No.: WO2017/151314
PCT Pub. Date: Sep. 8, 2017

(65) Prior Publication Data
US 2019/0081805 A1     Mar. 14, 2019

Related U.S. Application Data

(60) Provisional application No. 62/459,124, filed on Feb. 15, 2017, provisional application No. 62/362,352,
(Continued)

(51) Int. Cl.
*H04L 12/10*     (2006.01)
*H04L 67/12*     (2022.01)
(Continued)

(52) U.S. Cl.
CPC .............. *H04L 12/10* (2013.01); *H02M 1/10* (2013.01); *H04L 12/40045* (2013.01);
(Continued)

(58) Field of Classification Search
CPC ... H04L 12/10; H04L 12/40045; H04L 29/10; H04L 67/12; H02M 1/10; H02M 1/4233; Y04S 40/18; G06F 1/26; G06F 13/387
See application file for complete search history.

(56) References Cited

U.S. PATENT DOCUMENTS 5,991,172 A       11/1999  Jovanovic et al.
7,373,528 B2 *    5/2008   Schindler ................ G06F 1/266
                                                713/300
(Continued)

FOREIGN PATENT DOCUMENTS

CN       101826970 A      9/2010
CN       201639593 U     11/2010
(Continued)

OTHER PUBLICATIONS

First Office Action and Search Report received for CN application No. 201780024943.X, dated Jul. 29, 2020, 8 pages 19 (10 pages of english translation and 9 pages of official copy).
(Continued)

*Primary Examiner* — Aurel Prifti

(57) ABSTRACT

A system and/or method can include power of Ethernet (PoE) controller including a PoE interface, a device interface and a controller, communicatively coupled to the PoE interface and the device interface. The controller can be configured to receive device control information via the PoE interface and to generate control instructions in response to the device control information for the device interface.

16 Claims, 18 Drawing Sheets

Related U.S. Application Data filed on Jul. 14, 2016, provisional application No. 62/303,223, filed on Mar. 3, 2016.

(51) Int. Cl.
*H04L 69/32* (2022.01)
*H02M 1/10* (2006.01)
*H04L 12/40* (2006.01)
*G06F 1/26* (2006.01)

(52) U.S. Cl.
CPC .............. *H04L 67/12* (2013.01); *H04L 69/32* (2013.01); *G06F 1/26* (2013.01); *Y04S 40/18* (2018.05)

(56) References Cited

U.S. PATENT DOCUMENTS

| | | | |
|---|---|---|---|
| 7,587,289 B1* | 9/2009 | Sivertsen | F21V 23/0442 702/91 |
| 8,352,769 B1* | 1/2013 | Ghose | G05B 13/02 713/324 |
| 11,221,111 B2 | 1/2022 | Agro et al. | |
| 2003/0167345 A1* | 9/2003 | Knight | H04L 12/4604 709/249 |
| 2004/0164619 A1 | 8/2004 | Parker et al. | |
| 2007/0074052 A1 | 3/2007 | Hemmah et al. | |
| 2007/0263333 A1* | 11/2007 | Apfel | H02H 9/041 361/91.1 |
| 2009/0063874 A1* | 3/2009 | Diab | G06F 1/266 713/300 |
| 2009/0100210 A1 | 4/2009 | Thomas et al. | |
| 2010/0031070 A1 | 2/2010 | Tomomitsu | |
| 2010/0049994 A1* | 2/2010 | Ghoshal | G06F 1/26 713/300 |
| 2011/0077793 A1* | 3/2011 | Hsieh | H04L 12/10 700/297 |
| 2011/0298428 A1* | 12/2011 | Liu | G06F 1/266 320/162 |
| 2012/0084400 A1* | 4/2012 | Almadi | H04L 67/12 709/219 |
| 2012/0131372 A1* | 5/2012 | Hibi | H04L 12/10 713/340 |
| 2012/0254475 A1* | 10/2012 | Voss | H04L 12/2838 710/9 |
| 2012/0271477 A1* | 10/2012 | Okubo | H04L 12/10 700/297 |
| 2013/0117581 A1* | 5/2013 | Katkade | H04L 12/10 713/300 |
| 2013/0144448 A1* | 6/2013 | Luerkens | H04L 12/40045 700/286 |
| 2013/0187457 A1* | 7/2013 | Schlichter | H04L 12/10 307/31 |
| 2013/0339760 A1* | 12/2013 | Zimmerman | G06F 1/26 713/300 |
| 2013/0342688 A1* | 12/2013 | Siu | H04L 12/10 348/143 |
| 2014/0005909 A1* | 1/2014 | Meisner | F02C 9/00 701/100 |
| 2014/0040641 A1* | 2/2014 | Diab | H04L 12/10 713/300 |
| 2014/0098842 A1* | 4/2014 | White, III | H04L 12/12 375/219 |
| 2014/0208140 A1* | 7/2014 | Brooks | G06F 1/28 713/320 |
| 2014/0245031 A1 | 8/2014 | Hamdi et al. | |
| 2014/0354161 A1* | 12/2014 | Aggarwal | H05B 47/105 315/153 |
| 2014/0369687 A1* | 12/2014 | Jain | H04B 10/27 398/66 |
| 2015/0022096 A1* | 1/2015 | Deixler | H05B 47/10 315/153 |
| 2015/0084547 A1* | 3/2015 | Yeh | H04L 61/2038 315/312 |
| 2015/0127957 A1* | 5/2015 | Sethi | G06F 1/26 713/300 |
| 2015/0195883 A1* | 7/2015 | Harris | H05B 47/105 315/155 |
| 2015/0295732 A1* | 10/2015 | Lai | H04L 12/10 307/42 |
| 2015/0331464 A1* | 11/2015 | Balasubramanian | H04L 12/10 713/310 |
| 2015/0331821 A1* | 11/2015 | Liston | G06F 13/4282 710/106 |
| 2016/0020910 A1* | 1/2016 | Jones | H04L 12/40045 370/218 |
| 2016/0036268 A1* | 2/2016 | Laherty | H02J 9/065 307/19 |
| 2016/0037613 A1* | 2/2016 | Laherty | H05B 47/185 315/294 |
| 2016/0064938 A1* | 3/2016 | Balasubramanian | H04L 12/10 307/11 |
| 2016/0094350 A1* | 3/2016 | Picard | G06F 1/3206 713/300 |
| 2016/0134332 A1* | 5/2016 | Lai | H04B 3/548 375/257 |
| 2016/0157318 A1* | 6/2016 | Yadav | H05B 47/11 315/151 |
| 2016/0227630 A1* | 8/2016 | Wendt | H05B 47/18 |
| 2016/0273722 A1* | 9/2016 | Crenshaw | H05B 47/185 |
| 2016/0309561 A1* | 10/2016 | Hamilton | H05B 45/46 |
| 2016/0337137 A1* | 11/2016 | Yseboodt | H04L 12/40039 |
| 2017/0010645 A1* | 1/2017 | Jain | G06F 1/266 |
| 2017/0068307 A1* | 3/2017 | Vavilala | G06F 1/3296 |
| 2017/0111976 A1* | 4/2017 | Van Endert | H05B 47/18 |
| 2017/0118030 A1* | 4/2017 | Love | G06F 1/3243 |
| 2017/0237580 A1* | 8/2017 | Radermacher | H05B 47/185 307/38 |
| 2017/0366342 A1* | 12/2017 | Gehrmann | H04W 12/041 |
| 2018/0035505 A1* | 2/2018 | Foster | H04L 12/423 |
| 2019/0011283 A1* | 1/2019 | Soutar | H02J 7/00712 |
| 2019/0166088 A1* | 5/2019 | Krochik | H04L 67/2804 |

FOREIGN PATENT DOCUMENTS

| | | |
|---|---|---|
| CN | 102299807 A | 12/2011 |
| CN | 102918798 A | 2/2013 |
| CN | 103067183 A | 4/2013 |
| CN | 104520636 A | 4/2015 |
| CN | 204993396 U | 1/2016 |
| CN | 105379044 A | 3/2016 |

OTHER PUBLICATIONS

Office Action received for U.S. Appl. No. 17/555,504, dated Sep. 27, 2022, 6 pages.

\* cited by examiner

SYSTEM AND METHOD FOR POWER OVER ETHERNET CONTROL

RELATED APPLICATIONS

This patent application is a national stage of International Application No. PCT/US2017/017885, filed Feb. 15, 2017, which claims the benefit of U.S. Provisional Patent Application No. 62/303,223 filed on Mar. 3, 2016, No. 62/362,352 filed on Jul. 14, 2016, and No. 62/459,124 filed on Feb. 15, 2017, the entire contents of which are incorporated by reference in their entirety.

TECHNICAL FIELD

This disclosure relates to Power over Ethernet (PoE) systems, and more particularly to controllers for bridging PoE systems with facility management systems.

DESCRIPTION OF RELATED ART

This section introduces aspects that may help facilitate a better understanding of the inventions. Accordingly, the statements of this section are to be read in this light and are not to be understood as admissions about what is prior art or what is not prior art.

Power over Ethernet (PoE) is a technology for wired Ethernet local area networks (LANs) that allows the electrical current for the operation of connected devices to be carried by the data cables rather than by separate power cords. PoE can describe standardized or ad-hoc systems which pass electric power along with data on Ethernet cabling. This allows a single cable to provide both data connection and electric power to the devices, e.g., wireless access points, IP cameras and voice over Internet protocol (VoIP) phones.

SUMMARY

According to one aspect, systems and methods can provide a power over Ethernet (PoE) controller including a PoE interface, a device interface and a controller, communicatively coupled to the PoE interface and the device interface. The controller can be configured to receive device control information via the PoE interface and to generate control instructions in response to the device control information for the device interface.

Other systems, methods, features, and advantages is or will become apparent upon examination of the following figures and detailed description. It is intended that all such additional systems, methods, features, and advantages be included within this description and be protected by the accompanying claims.

BRIEF DESCRIPTION OF THE DRAWINGS

The present invention is illustrated by way of example and not limited in the accompanying figures in which like reference numerals indicate similar elements.

Specific embodiments of the present invention are disclosed below with reference to various figures and sketches. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

Figure 1:
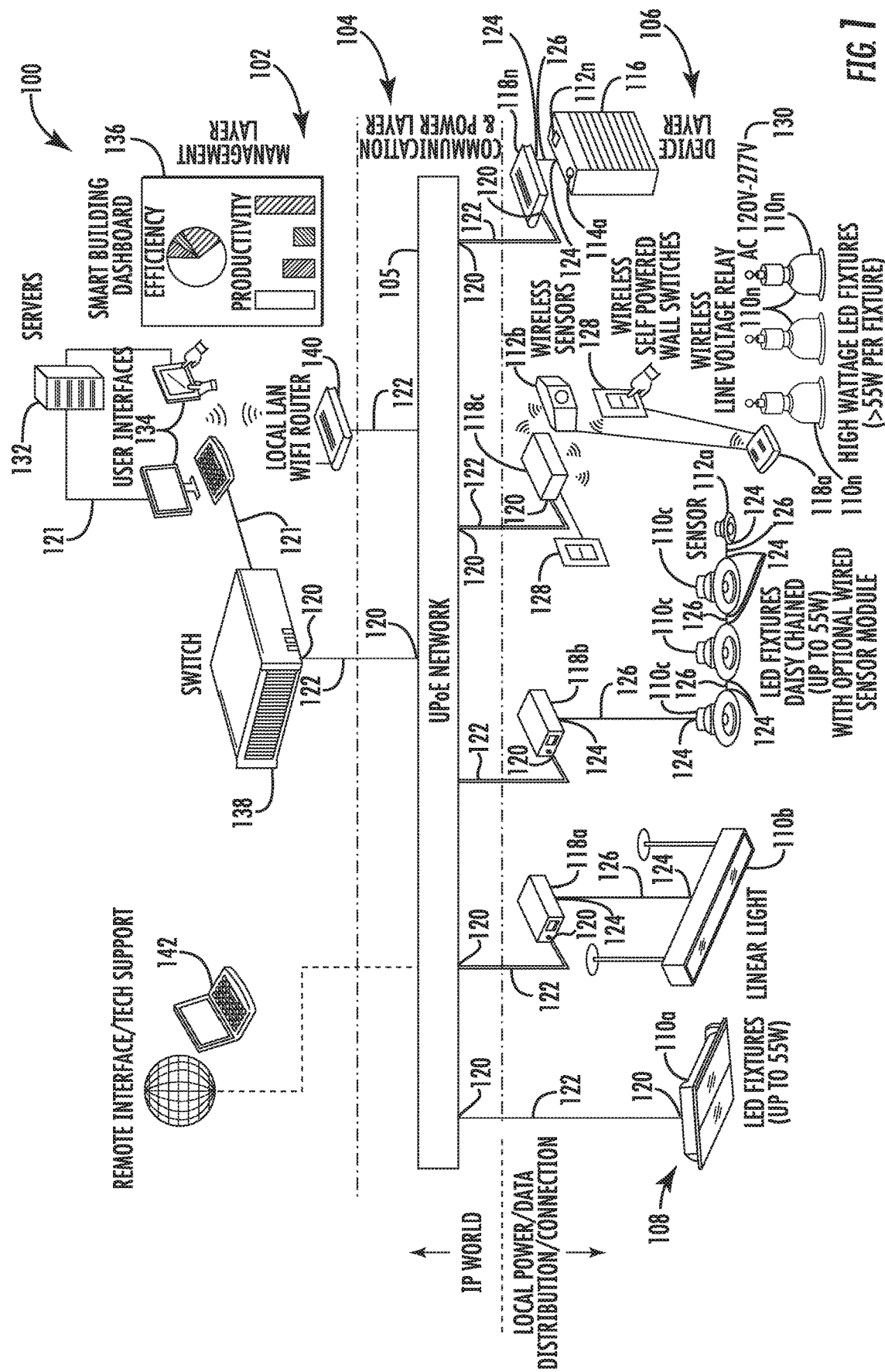

FIG. 1 is a block diagram of an example system architecture for a powered device network.

Figure 2:
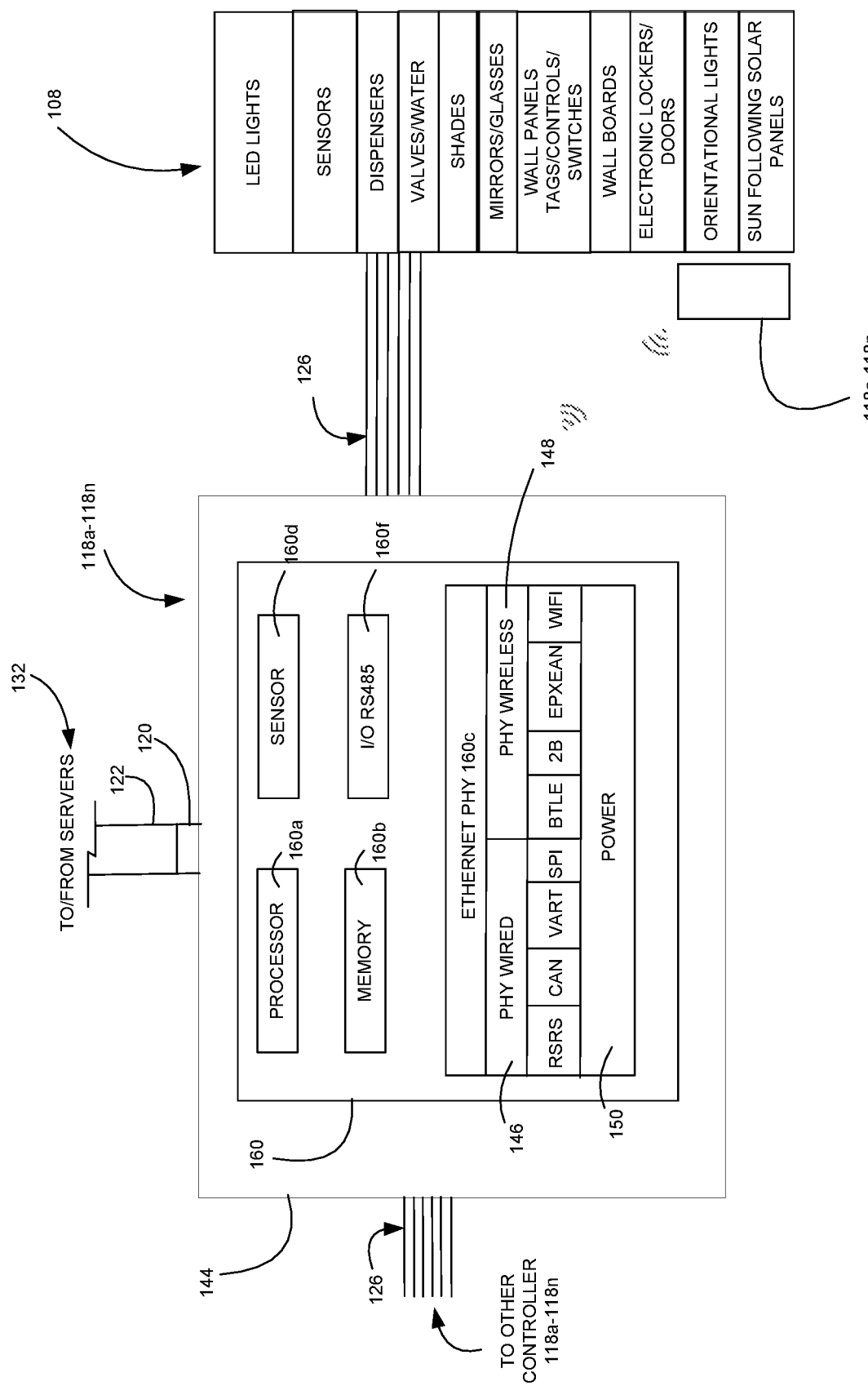

FIG. 2 is a block diagram of an example interfacing of the controller.

Figure 3:
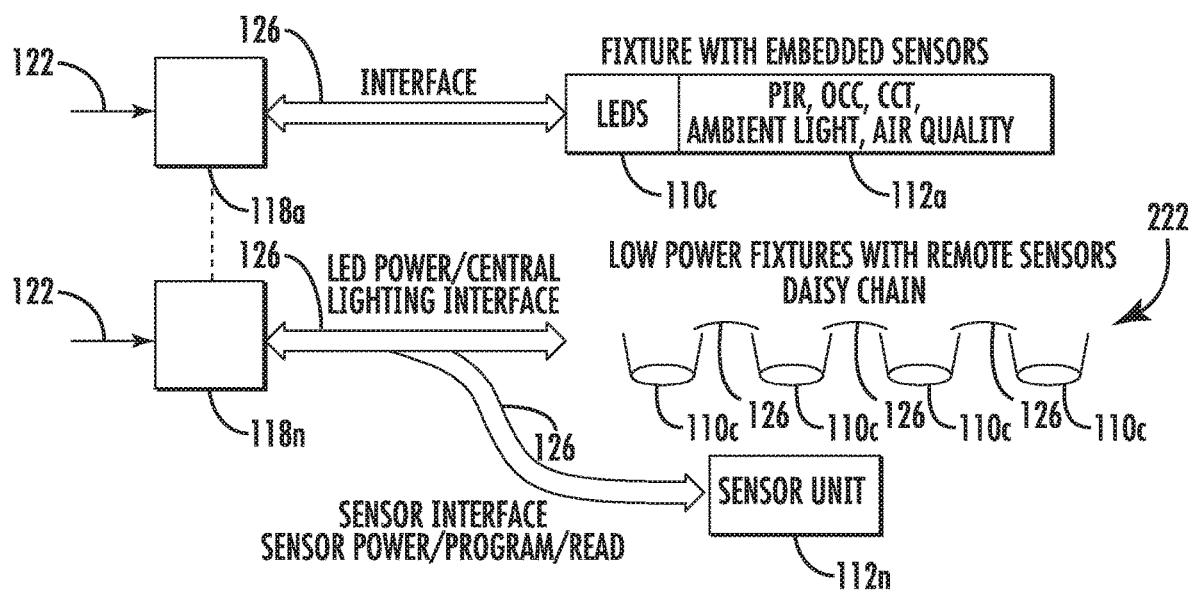

FIG. 3 is a block diagram of an example lighting implementations connected with the controller.

Figure 4:
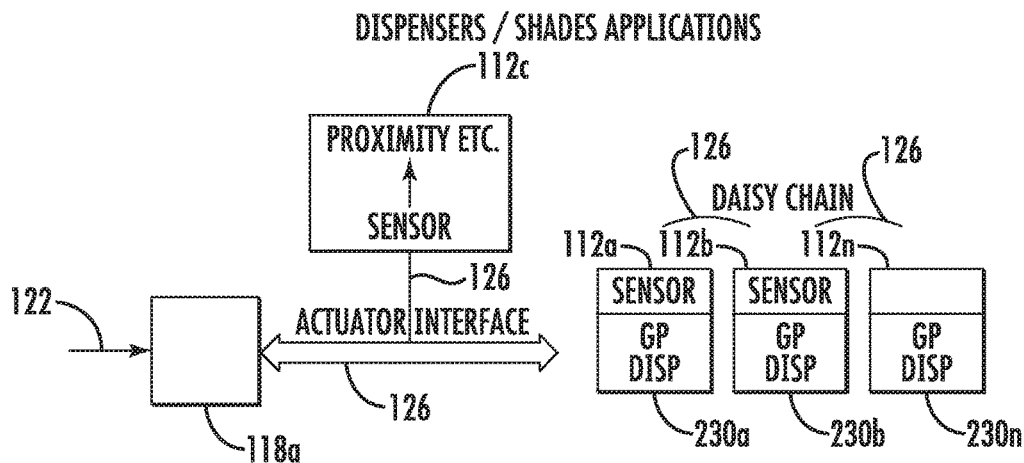

FIG. 4 is a block diagram of an example dispenser implementation connected with the controller.

Figure 5:
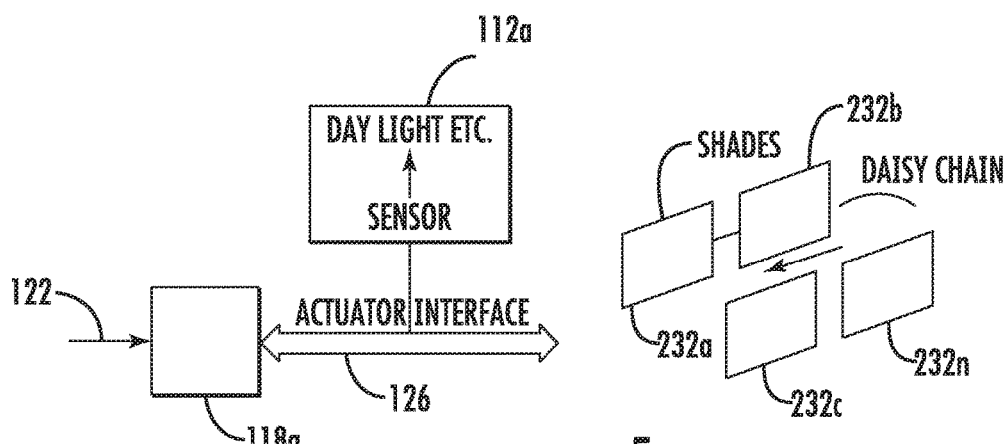

FIG. 5 is a block diagram of an example shade implementation connected with the controller.

Figure 6:
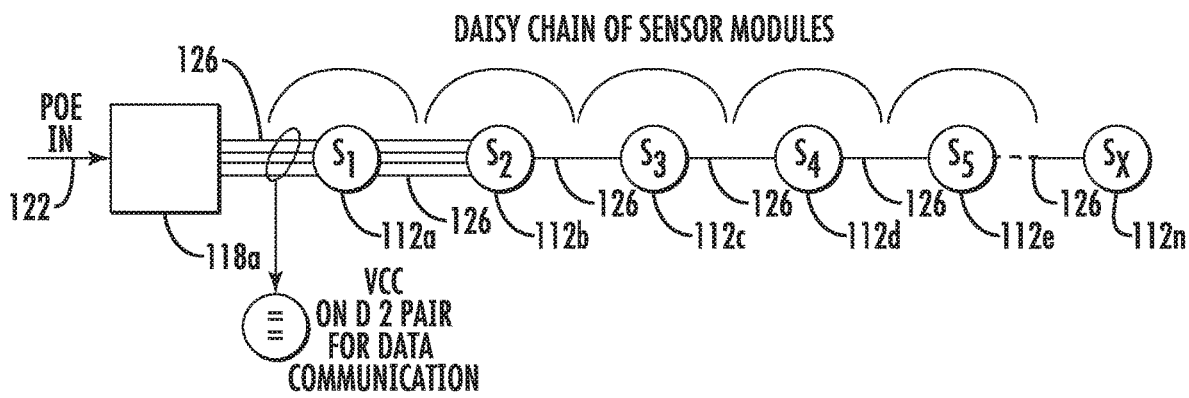

FIG. 6 is a block diagram of an example sensor implementation connected with the controller.

Figure 7:
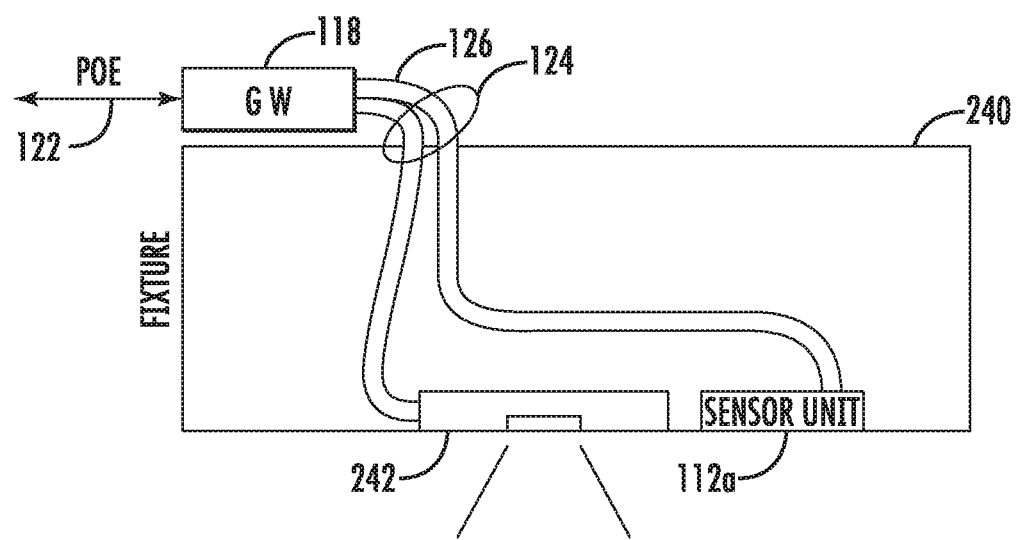

FIG. 7 is a block diagram of an example fixture implementation connected with the controller.

Figure 8:
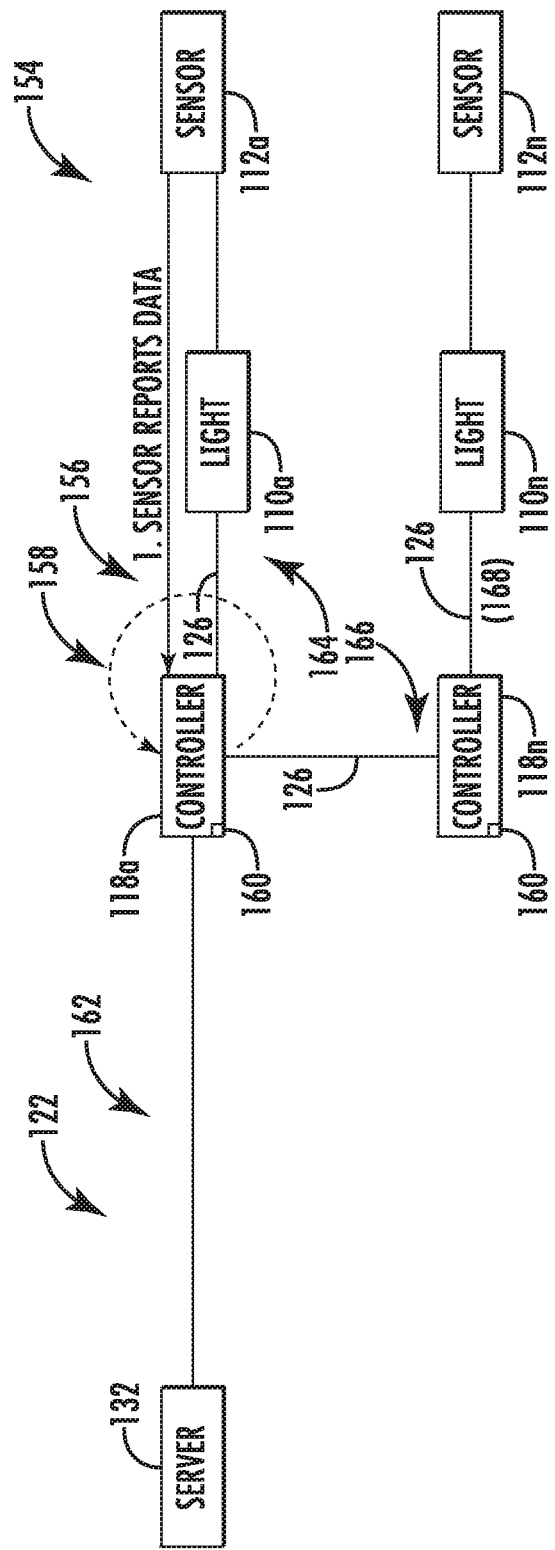

FIG. 8 is a block diagram of an example communication logic of the controller.

Figure 9:
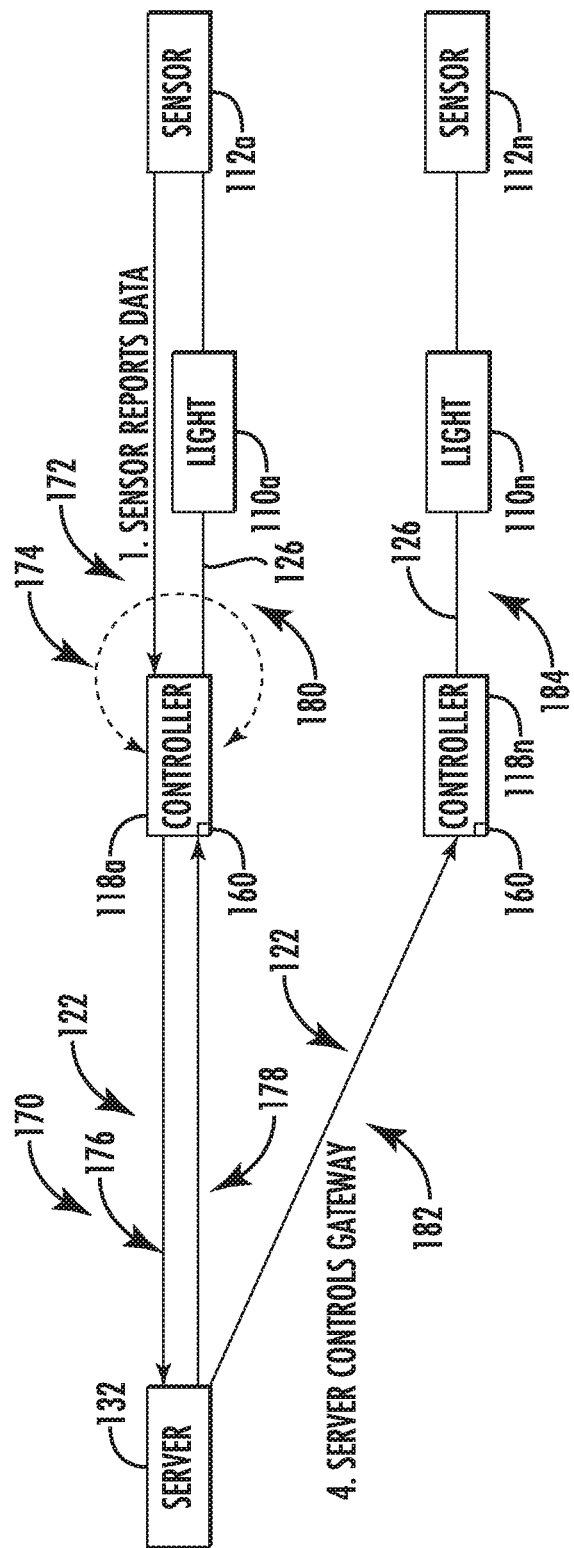

FIG. 9 is a block diagram of example relay logic between the server and the controller.

Figure 10:
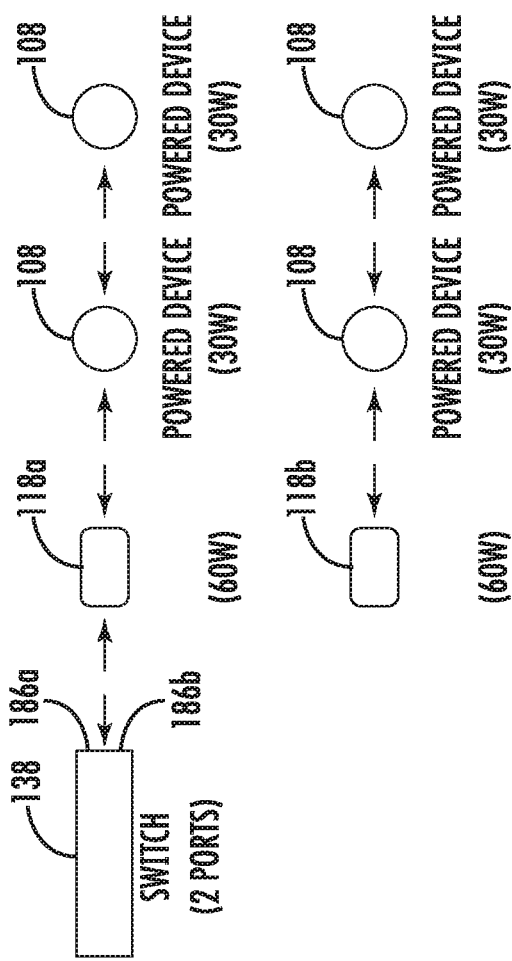

FIG. 10 is a block diagram of an example power sharing logic via the controller.

Figure 11:
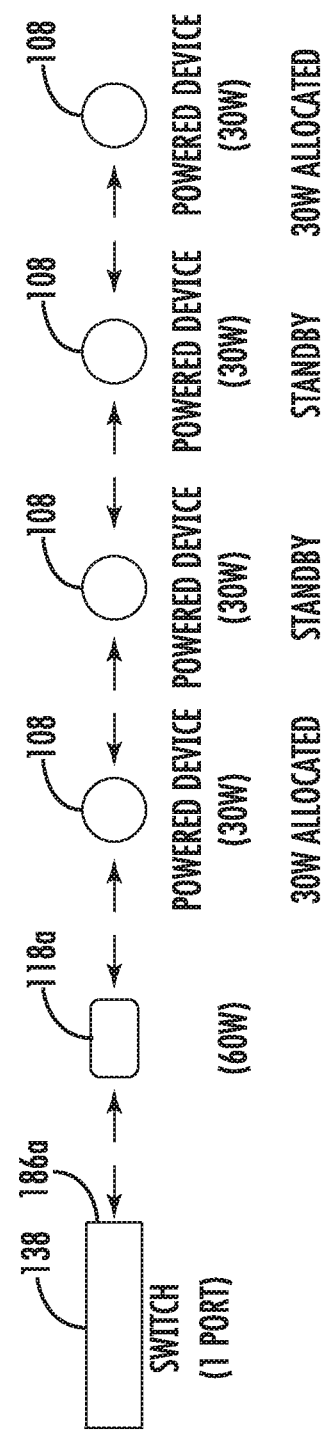

FIG. 11 is a block diagram of another example power sharing logic via the controller.

Figure 12:
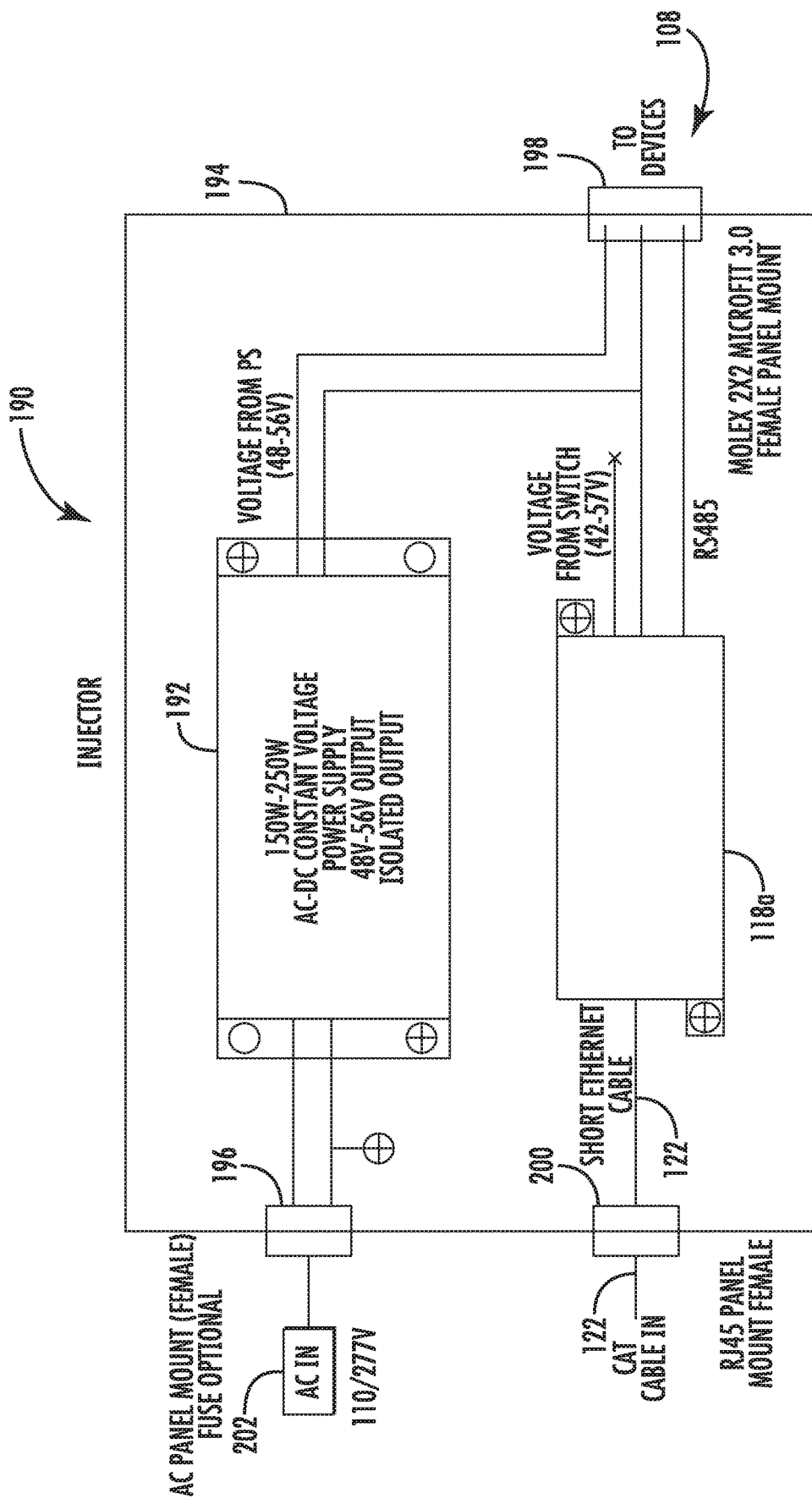

FIG. 12 is a block diagram of an example injector point implementing the controller.

Figure 13:
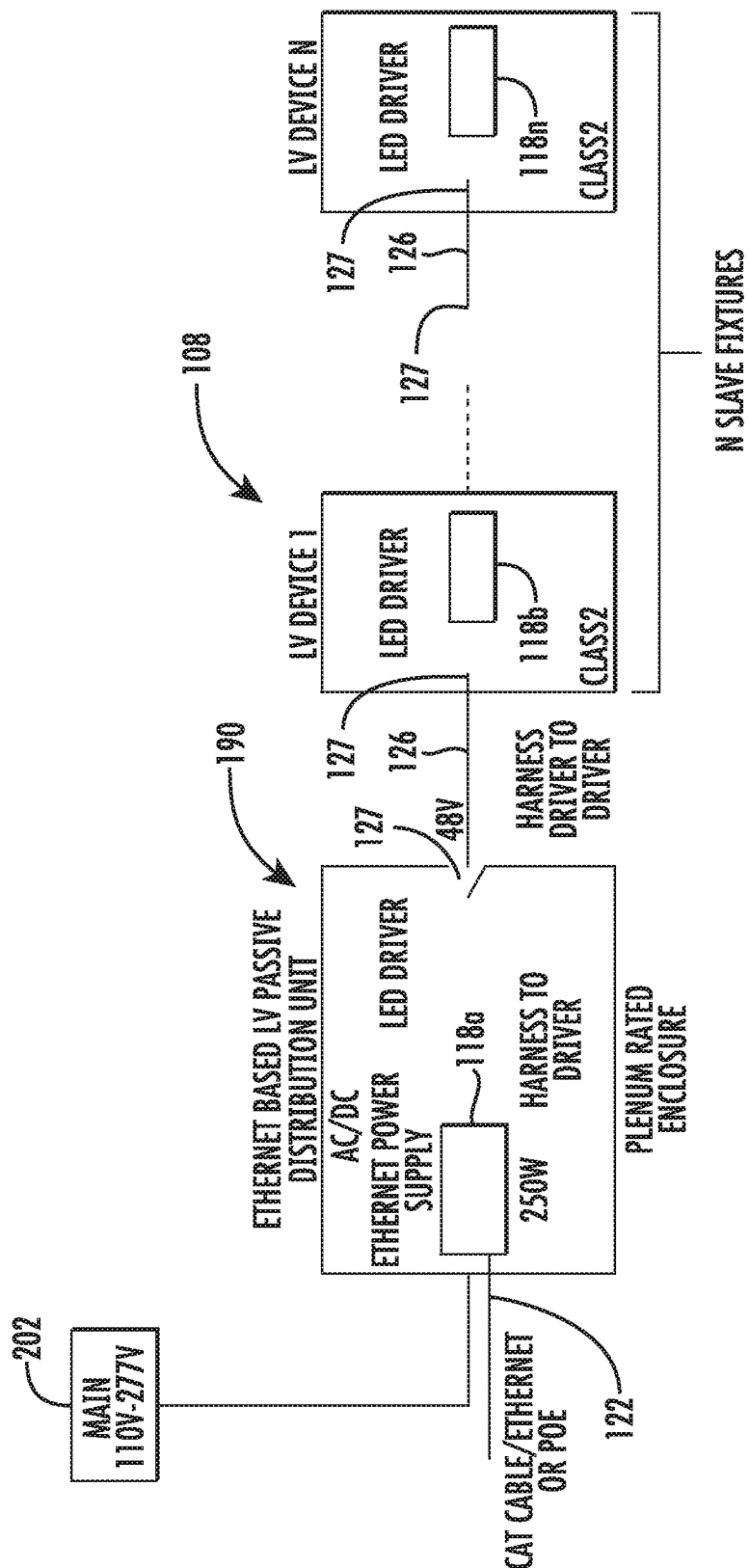

FIG. 13 is a block diagram of an example low voltage output injector point with daisy-chained outputs.

Figure 14:
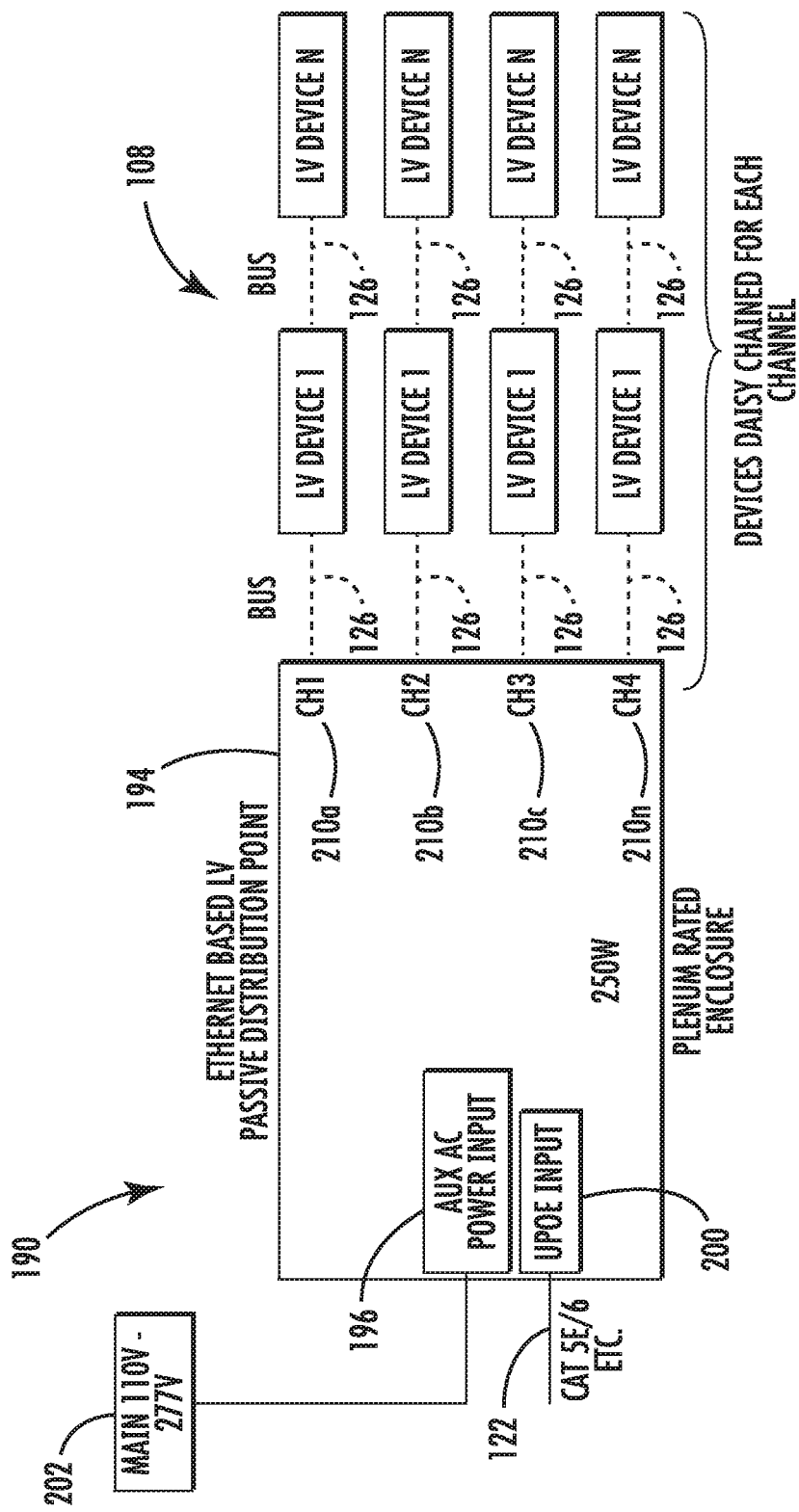

FIG. 14 is a block diagram of an example low voltage output injector point with multi-channel outputs.

Figure 15:
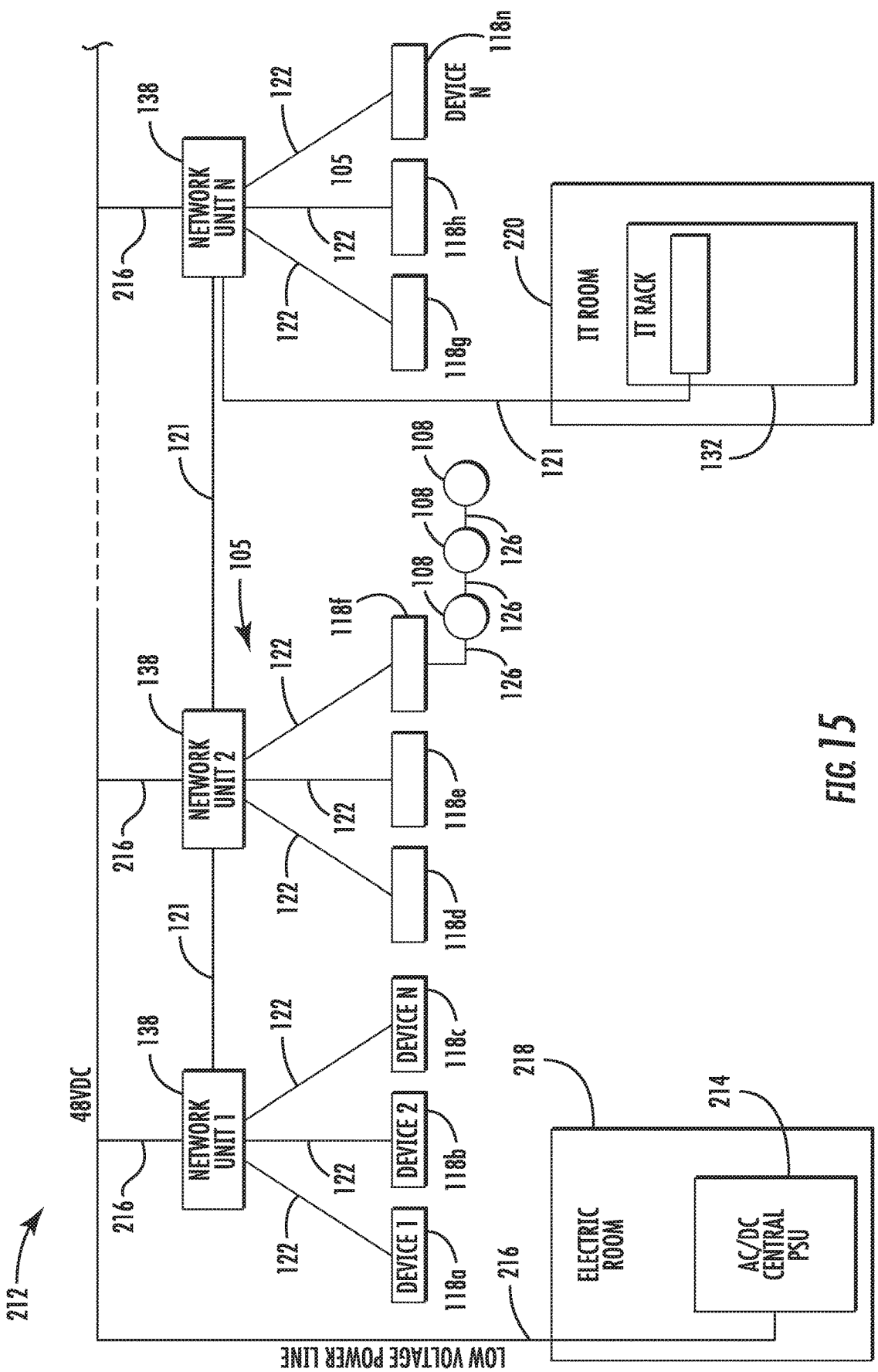

FIG. 15 is a block diagram of an example architecture for a low voltage network.

FIGS. 16-20 are block diagrams of various power supply scenarios to the low voltage network.

Figure 21:
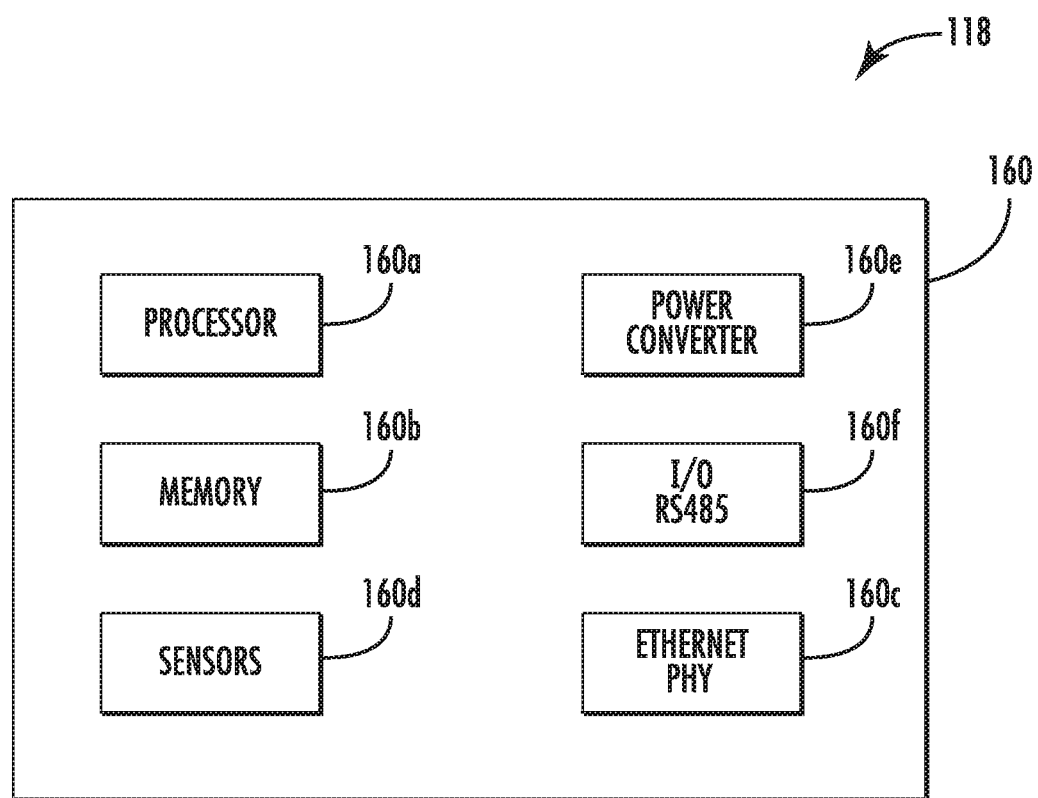

FIG. 21 is an example circuit board for the controller.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

FIG. 1 is a block diagram of an example system architecture 100 for a powered device network. In one example, the system architecture 100 can include a management layer 102, a communication/power layer 104 and a device layer 106. The communication/power layer 104 can include a PoE network 105, including but not limited to, Institute of Electrical and Electronics Engineers (IEEE) 802.3 networks, e.g., PoE, Universal PoE (UPoE), PoE plus (PoE+), and Four Pair PoE (4PPoE), and/or Constrained Application Protocol (CoAP) type networks, Transmission Control Protocol/Internet Protocol (TCP/IP) type networks, etc. The communication/power layer 104 can also include application programming interfaces (APIs) for interacting with the management layer 102, etc.

The communication/power layer 104 connects the management layer 102 with powered devices 108 located in the device layer 106. The communication/power layer 104 can provide power to and/or control of the devices 108. Example devices 108 can be categorized into lighting units 110a-n (e.g., LED/fluorescent fixtures 110a, linear lights 110b, daisy-chain connected fixtures 110c, high wattage fixtures 110n, light modules, LED lighting engines, etc.), sensors 112a-n (e.g., wired 112a and wireless sensors 112b, including but not limited to, optical/light sensors, e.g., ambient light, correlated color temperature (CCT), infrared (IR), etc., environmental sensors, e.g., temperature, humidity, air quality, chemical, etc., motion/gesture sensors, inertial sensors, proximity sensors, etc.), and/or actuators 114a-n (e.g., motor 114a for controlling shade 116, valves, relays, etc.). Daisy-chain connected fixtures 110c, and other daisy-chain connected devices 108, can be individually addressable by controllers 118a-n for the controller 118a-n to provide power and/or data to specified devices 108, without the devices 108 requiring access to the Internet. In some embodiments, the addresses can be stored as tables in memory 164 in one or more of the controllers 118a-n. Other types of devices 108 that can be included in the device layer 106 to be powered and/or controlled by controller 118a-n, include, but are not limited to, other types of lighting devices, display devices, motors, valves, actuators, relays, dispensers, sinks, faucets, shades, mirrors, glass, windows, wall panels, wall controls, wall tags, wall switches, wall boards, doors, lockers, communication devices, computers, solar panel assemblies, batteries, locking devices, smart plugs, smart phones, cameras, beacons, sensors, etc., as described in more detail below.

The device layer 106 also includes controllers 118a-n which can convert or translate from the PoE network 105 protocols to local power, data distribution and connection protocols, to bridge the PoE network 105 with the device layer 106. For example, the controllers 118a-n provide for sending/receiving signals to/from the devices 108, powering the devices 108, controlling power to the devices 108, and/or controlling operation of the devices 108, etc., as described in more detail below. In some embodiments the controllers 118a-n perform gateway functions.

The controllers 118a-n can interface with the PoE network 105 via Ethernet ports 120, e.g., for RJ45 connectors, and connect with the PoE network 105 via Ethernet cables 122, e.g., Category 3, Category 5/5e, Category 6 cable, etc. In some examples, the controllers 118a-n can control how power received from the PoE network 105 is outputted to the devices 108, e.g., in terms of type of power and/or amount, and/or convert the Ethernet or other high level protocol into a lower level protocol, e.g., RS232, RS485, CAN, BACnet, digital addressable lighting interface (DALI), TRANSCEND by MOLEX, etc., for interfacing with and controlling the devices 108. For sake of explanation, RS485 is generally referred to herein, but implementations are not limited to PS485. The controllers 118a-n can also interface with other controllers 118a-n, e.g., in a daisy-chained fashion.

In one example, the controllers 118a-n include an interface 124 for making wired and/or wireless connections with the devices 108 and/or other controllers 118a-n, as described in more detail below. In the wired implementation, a wired harnesses 126 can be used for connecting the controllers 118a-n to the devices 108. In one example, the wired harness 126 includes four wire, e.g., one for each of voltage, ground, RS+ and RS−. Other configurations are possible, e.g., depending on the low level protocol being used. In addition to the devices 108, the controllers 118a-n can connect with other peripherals including wall switches 128, via wired and/or wireless connections. The controllers 118a-n can control the devices 108 based on signals received from the wall switch 108, e.g. to turn on/off the devices 108, dim lighting units 110a-n, control shades 116, etc. In some examples, the controllers 118a-n can also connect with an external power source 130, e.g., 110V-277V AC, as described in more detail below.

Control information can also be sent to the devices 108 from the management layer 102 via the PoE network 105 and the controllers 118a-n, for controlling the devices 108 and receiving status and/or sensor information from the devices 108. In some examples, the management layer 102 includes servers/switches 132 for storing data, performing analytics, and sending and receiving control information and/or sensor information related to the devices 108, etc., as described in more detail below. The servers/switches 132 can connect with user interfaces 134, e.g., personal computers (PCs), laptops, smart phones, tablets, personal digital assistants (PDAs), etc., via an Ethernet network 121, for inputting control information used to control the devices 108 and/or displaying dashboards 136 related to operation of the devices 108. The management layer 102 can also include network switches 138, e.g., a Catalyst switch manufactured by Cisco or other network unit controller, connected with the servers 132 and user interfaces 134, for outputting the PoE protocol data and power to the PoE network 105. The management layer 102 can also include wireless (WiFi) routers 140 for supporting power and data communications over the PoE network 105, and a remote interface 142, e.g., for providing technical support to the PoE network 105.

FIG. 2 is a block diagram of an example interface 144 of the controller 118a-n. In one example, the interface 144 of the controller 118a-n can connect to devices 108 and/or other controllers 118a-n via harness 126, e.g., to send/receive control information, sensor data, power, etc., between the controller 118a-n and the devices 108 and other controllers 118a-n. The interface 144 can include a physical (PHY) wired layer 146, including a physical port with connections to send/receive wired signals based on the RS485 protocol, a controller area network (CAN) protocol, a universal asynchronous receiver/transmitter (UART) protocol, a serial peripheral interface (SPI) protocol, etc. or other non-Ethernet related protocol. Additionally or alternatively, the interface 144 can include a PHY wireless layer 148 to send/receive wireless signals to devices 108, e.g., via controllers 118a-n optionally integrated into the devices 108, including but not limited to Bluetooth low energy (BTLE) protocol, ZigBee protocol, EnOcean protocol, IEEE 802.11 (WiFi) protocol, etc. The interface 144 can also send power 150 to the devices 108. Example devices 108 include but are not limited to LED lights, sensors, paper and other dispensers, valves, shades, mirrors/glasses, wall panels including tags, controls and/or switches, wall boards, electronic lockers/doors, oriented lighting, sun following solar panels, etc. and/or any of the other devices 108 described herein.

Referring also to FIG. 21, to accommodate translations from one protocol to another and other logic of the controllers 118a-n, the controllers 118a-n can include a printed circuit board assembly (PCBA) 160, and/or other type of electrical components. In some embodiments, the PCBA 160 is sized and shaped to fit the device 108, e.g., via round shapes, oval shapes, rectangular shapes, square shapes, triangular shapes, irregular shapes, etc. The PCBA 160 may include one board or more than one board connected with each other and in some embodiments stacked on each other. It will be appreciated that where PCBA 160 is described, it is described by way of non-limiting example, such that alternative assemblies on which circuitry and/or other electronic components may be embodied may be substituted for PCBA 160 within the scope of the disclosure, including but not limited to, circuit boards having point to point construction, application-specific integrated circuit (ASIC), field programmable gate array (FPGA), etc. In some embodiments, a control circuitry is located on the PCBA 160.

The control circuitry may, for example, include one or more processors 160a and one or more memory devices 160b, e.g., in some embodiments implemented as a microprocessor with memory. The memory devices can include one or more of a program memory, a cache, random access memory (RAM), a read only memory (ROM), a flash memory, a hard drive, etc., and/or other types of memory. The memory 160b can store instructions (e.g., compiled executable program instructions, un-compiled program code, some combination thereof, or the like)), which when performed (e.g., executed, translated, interpreted, and/or the like) by the processor 160a, causes the processor 160a to perform the translations, logic and other processes described herein. For example, the processor 160a can translate Ethernet based protocol signals, received via Ethernet PHY 160c, into non-Ethernet based protocol signals, and vice versa, e.g., for providing communication between the server 132 and the lights 110a-n or other devices 108, and sensors 112a-n. The PCBA 160 can also include sensor 160d, similar to or different than sensor 112a-n. More than one sensor type and/or multiple sensors 160d can be included on the PCBA 160. The PCBA 160 can also include a power converter 160e, e.g. for converting 48 VDC power from the PoE input to 5VCD and 3.3 VDC, etc. to power processor 160a, the Ethernet PHY 160c, etc. The controller 118 can also pass the power to devices 108, e.g., via RS485 input/output (I/O) 160f. Additional or alternative components may be included on the PCBA 160, including, but not limited to, an onboard analog-to-digital converter and/or other circuitry that may be configured to convert analog signals into digital signals, e.g., for processing. The PCBA 160 can also include digital conditioning circuitry for processing the signals, etc.

FIG. 3 is a block diagram of an example lighting implementations connected with the controllers 118a-n. For example, the controller 118n can connect via wired harness 126 to LED lighting unit 110c with embedded sensor 112a, to control the LED lighting unit 110c and receive sensor information from sensor 112a. In some embodiments, the controller 119a can control the LED lighting unit 110c locally based on the received sensor information from the sensor 112a and/or pass the sensor information to a remote server 132. Additionally or alternatively, controller 118n can connect via wired harness 126 with low power fixture 222 and remote sensor unit 112n. Other implementations are possible, for example, a remote sensor connected with the LED lighting unit 110c and sensor embedded with the low power fixtures 222, etc.

FIG. 4 is a block diagram of an example dispenser 230a-n implementation connected with the controller 118a. In one example, the controller 118a connects with motors of the paper towel dispensers 230a-n to control power to the paper towel dispensers 230a-n based on available power and the received signals from the motion sensors 112a-n of the paper towel dispensers 230a-n. Other dispensers 230a-n, include, but are not limited to, soap, towels, lotion, air, heated air, fragrance, sound, verbal instructions, information, communication from others, or warnings FIG. 5 is a block diagram of an example shade 232a-n implementation connected with the controller 118a. The shades 232a-n can connect with the controller 118a to receive instructions from the controller 118a, for example, when to open, close, etc. The controller 118a can be integrated in the shades 232a-n and/or connected with the shades 232a-n. In one example, the controller 118a can control operation of motor of the shades 232a-n to move the shades, e.g., based input from sensor 112a, on instructions from the servers 132 and/or instructions from the controller 118a, etc. The shades 232a-n can be individually addressable, e.g., with MAC addresses, so that the controller 118a can control one or more of shades 232a-n connected with the controller 118a. In some examples, the controller 118a can control the shades 232a-n based on information from an ambient light sensor 112a connected with the controller 118a, e.g., either wirelessly or via the wired harness 126. The controller 118a-n allows for sensor 112a, and any other sensors described herein, to be hot-swappable added and removed from the controllers 118a-n.

FIG. 6 is a block diagram of an example sensor 112a-n implementation connected with the controller 118a. Sensors 112a-n can be connected with controller 118a to provide information about one or more of humidity, acceleration, proximity, magnetism, pressure, motion, flux, $CO/CO_2$, CCT, red/green/blue (RGB) light, ambient light, active or passive infrared (PIR), visual information, e.g., from a camera, audio information, e.g., from a microphone, temperature, etc. In response to the controller 118a receiving data sent by one or more sensors 112a-n, the controller 118a can provide one or more of a visual signal, audio signal, etc.

FIG. 7 is a block diagram of an example fixture 240 implementation connected with the controller 118a. In some examples, the fixture 240 includes the controller 118a built into it but the controller 118a can be separate from the fixture 240 and connected with the fixture 240. The fixture 240 can also include a light source 242, e.g., LED or florescent. In some implementations the fixture 240 is a troffer. The light source 242 and the sensor connect with the controller 118a. The controller 118a can activate the light source 242 based on information from the sensor 112a.

FIG. 8 is a block diagram of an example communication logic 154 of the controllers 118a-n. For the sake of explanation, in one example, the controller 118a receives data reported by the sensor 112a (156), e.g., a motion detector that detects motion of lack of motion over a determined time. The sensor 112a can be integrated into the light 110a or provided separately from it. Moreover, the controller 118a-n can be integrated into the light 110a or separate from it. The controller 118a can process the data received from the sensor 112a, and any other sensors, to decide what action to take based on the data (158).

The controller 118a can send the server 132 the data received from the sensor 112a. Before sending the data to the server 132 the controller 118a can translate the data from one protocol used by the controller 118a to communicate with the sensor 112a, e.g., RS485, to another protocol used for communicating the data with the server 132, e.g., an IEEE 802.3 Ethernet protocol. Other protocols can be used. The controller 128a-n can also translate information received via the IEEE 802.3 Ethernet protocol to the RS485 protocol or other local protocol. The controller 118a can directly control the light 110a based on the data received from the sensor 112*a* and processed by the controller 118*a* (164), by sending control information to the light 110*a*, e.g., to turn the light 110*a* on/off, dim the light, flash the light, use the light as an emergency indicator, etc., without input from the server 132. The controller 118*a* can also send the data and/or control information to the other controller 118*n* (166), which can use the data and/or control information to control light 110*n*, and any other devices connected with the controller 118*n* (160). By using the controllers 118*a-n* to process data and/or control devices 108, fewer Ethernet switches may be needed than would normally be needed to control more than one light 101*a-n* or other devices 108, e.g., instead of requiring one switch port per device 108. Additionally or alternatively, the controllers 118*a-n* can monitor communication availability with the server 132, and if communication with the server is lost, one of the controllers 118*a-n* can take control as master to the other controllers 118*a-n*.

FIG. 9 is a block diagram of example relay logic 170 between the server 132 and the controllers 118*a-n*. The sensor 112*a* reports data to the controller 118*a* (172). The controller 118*a* processes the data (174). In this example, the controller 118*a* determines to forward the data to the server 132 for further processing (176). The controller 118*a* receives the data from the sensor 112*a* via a local protocol, e.g., RS485, and translates the data into a wide area protocol, e.g., IEEE 802.3 PoE, for sending to the server 132. Upon the server 132 processing the data, the controller 118*a* receives control instruction from the server 132 (178). The controller 118*a* control the light 110*a*, and any other devices connected with the controller 118*a*, based on the control information received from the server 132. The controller 118*a* can translate the control information into the local protocol for sending to the light 110*a*, e.g., via harness 126. The server 132 can also send control information to other controllers 118*a-n* based on the processed sensor data, including controller 118*n*. The controller 118*n* can control light 110*n*, and any other devices connected with the controller 118*n*, based on the control information. By using the controllers 118*a-n*, less Ethernet switches may be needed then would otherwise be needed to control more than one light 110*a-n* or other device 108.

FIGS. 10 and 11 are block diagrams of an example power sharing logic via the controllers 118*a-n*. In FIG. 10, the network switch 138 includes two ports 186*a,b* and FIG. 6 is an example of a network switch 138 with one port 186*a*. For the sake of explanation, in one example, in FIG. 5, controller 118*a* connects two devices 108 with port 186*a* and controller 118*b* connects two devices with port 186*b*. Each port 186*a,b* allows up to 60 W of power, e.g., as determined by the standard, and each device 108 consumes 30 W. In this example, the controllers 118*a,b* can determine to pass power to each device 108 without placing any device 108 in standby mode based on the available power not exceeding the maximum required power.

In the FIG. 11 example, the controller 118*a* allows more devices 108 to connect with the controller 118*a* than can otherwise be connected to the controller 118*a*, e.g., based on the standards, underwriters laboratories (UL) limits, etc. For example, the power needs of the devices 108 connected to the controller 118*a* may exceed power constraints determined by the standards. For example, the port 186*a* of the switch 138 provides a maximum 60 W output under the standard and the controller 118*a* connects with four devices 108 in daisy-chain fashion, each requiring 30 W peak power. In one example, the controller 118*a* can share available power to the devices 108 by passing power allocation privileges from device 108 to device 108. For example, the controller 118*a* puts the devices 108 on power standby until a device 108 requests power from the controller 118*a*. If power is available to be allocated to the device 108, the controller 118*a* authorizes the device 108 making the request to exit standby mode and use the power, otherwise the device 108 remains on standby. The controller 118*a* can determine when to provide power to the devices 108 and/or the devices 108 can request power from the controller 118*a* when needed. The controller 118*a* can determine which devices 108 that are not in standby but not using power for the longest time and put those devices 108 into standby mode. This allows any number of devices 108 to be connected with the controller 118*a* in which the controller 118*a* allows a finite number of devices 108 to have the full power that they need at any one time. For example, not all shades 116 and 132*a-n* may need be activated at the same time. Some shade can wait unit the controller 118*a* authorizes the use of power. In another example, some devices 108 may only need to be used sparingly at full power. For example, the controller 118*a* can instruct a less active paper towel dispenser to remain in standby mode until needed, while authorizing a more active paper towel dispenser to receive power. Depending on how long the activation cycle is a user may not even notice that the device 108 was in standby mode. By decreasing a number of ports 186*a* and/or controllers 118*a-n* needed per device 108, the controller 118*a* can provide for reduced installation costs, including but not limited to a reduced number of ports 186*a*, a reduced number of switches 138, a reduced number of wiring, smaller storage spaces needed for the switches 138, lower heating, ventilation and air conditioning (HVAC) loads, etc. For example, a PoE connection is not needed for each device.

FIG. 12 is a block diagram of an example injector point 190 integrated with, and/or implementing, the controller 118*a*. The injector point 190 includes an AC-DC constant voltage power supply 192 connected with the controller 118*a* for the power distribution point 190 to provide different power options than are normally available with IEEE 802.3 based PoE protocols, e.g., 12.5 W PoE, 25 W PoE+, and 51 W UPoE, etc. The power supply 192 and controller 118*a* can be housed in the same housing 194 or the controller 118*a* can be housed separately. The power supply 192 receive an AC input 202, e.g., 110V/277V or other voltage, via plug 196, and outputs a constant 150 W-250 W, 48V-56V voltage to plug 198 for supplying power to devices 108. Other power and voltage amounts can be used depending on an implementation. The controller 118*a* can receive data and power via Ethernet plug 200, e.g., that accommodates an RJ45 connector. The controller 118*a* translates the data to another protocol, e.g., RS232, RS485, CAN, BACnet, digital addressable lighting interface (DALI), transcend, etc., and sends the translated data to plug 198 for outputting data via plug 198.

FIG. 13 is a block diagram of an example low voltage output injector point 190 with devices 108 daisy-chained together. In one example, the devices 108 include low voltage LED devices. In some embodiments, each device 108 includes a controller 118*a-n* integrated into or connected to but in a separate enclosure from the device 108. Multiple devices 108 can be connected together in a daisy-chained manner via harnesses 126 with connecters 127. The devices 108 can also connect to the injector point 190 via harness 126. The daisy-changed devices 108 can be individually addressable, e.g., using a MAC address, for separate and/or combined control of devices 108 by a master controller 118*a-n*. As devices 108 are added and removed from the controller 118*a-n*, the controller 118*a-n* can update a list of devices 108 connected to the controller 118*a-n*.

FIG. 14 is a block diagram of another example low voltage based injector point 190. In some examples, the injector point 190 can provide multiple channels of outputs 210*a-n*, e.g., four channels, each with a sub-address. Each output 210*a-n* can connect to a device 108, e.g., low voltage device, and the low voltage devices can be daisy-chained to other low voltage devices 1-N on the channels.

Some advantages of the injector point 190 of FIGS. 7-9 include, but are not limited to, the ability to convert auxiliary power from the AC line for use with the controller 118*a*, converting the Ethernet protocol into a low level protocol, transmitting DC power and data to devices via single or multiple inputs, isolating AC auxiliary inputs from PoE power inputs, providing power management and/or emergency lighting schemes, providing network upgrades, the ability to act as a zone injector point, providing compliance with IEEE 802.3 but not being limited to 60 W or other Watt maximum power, not requiring devices 108 to communicate via Ethernet based protocols, provide power and control to a variety and group of devices, e.g., lights, sensors, actuators in daisy-chain configurations, provide a reliable and robust network since one or more of Ethernet and AC power is available, the ability to use UPoE as an emergency backup when auxiliary power is lost, e.g., for emergency/vital lighting requirements, the ability to use auxiliary power when PoE power/control is lost, minimize a number of power sourcing equipment (PSE) ports necessary and/or cutting the cost of low voltage infrastructures.

FIG. 15 is a block diagram of an example architecture for a low voltage network 212. Network switches 138 can receive power from a power supply unit 214 via low voltage power lines 216, e.g., 48 VDC. The network switches 138 can also receive control information from servers 132, and can be networked together, e.g., via the Ethernet network 121. The power supply unit 214 can be housed in an electric room 218 and the servers housed in a separate information technology (IT) room 220. The network switches 138 can convert the inputted power and control information to the PoE network 105 and send the power and control information to controllers 118*a-n* via Ethernet cables 122. The controllers 118*a-n* can convert the PoE based protocol to a low level protocol for communicating with devices 108. The controllers 118*a-n* can connect with the devices 108 wirelessly and/or via a wired harness 126 for sending power and/or data to the devices 108 to control the devices 108.

Figure 16:
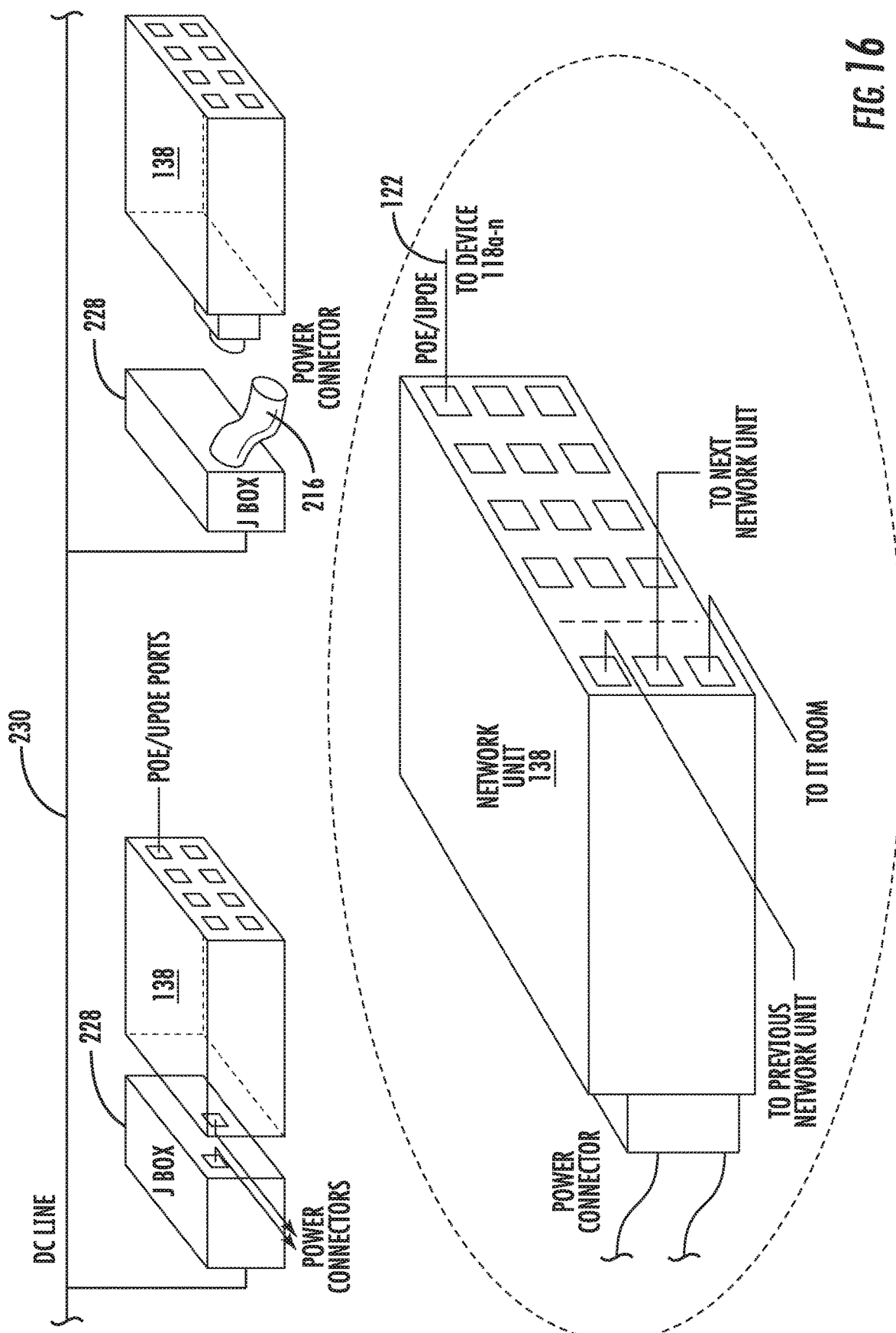
Figure 17:
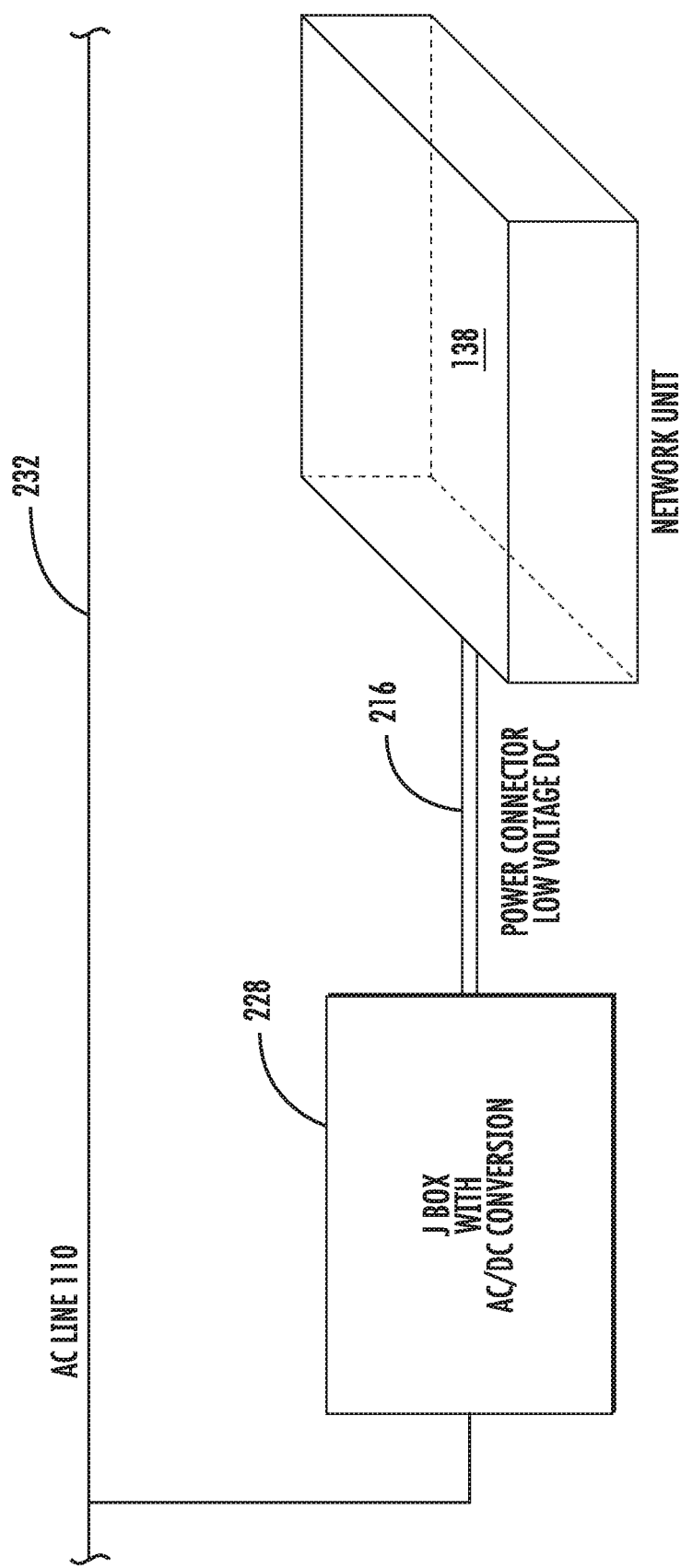
Figure 18:
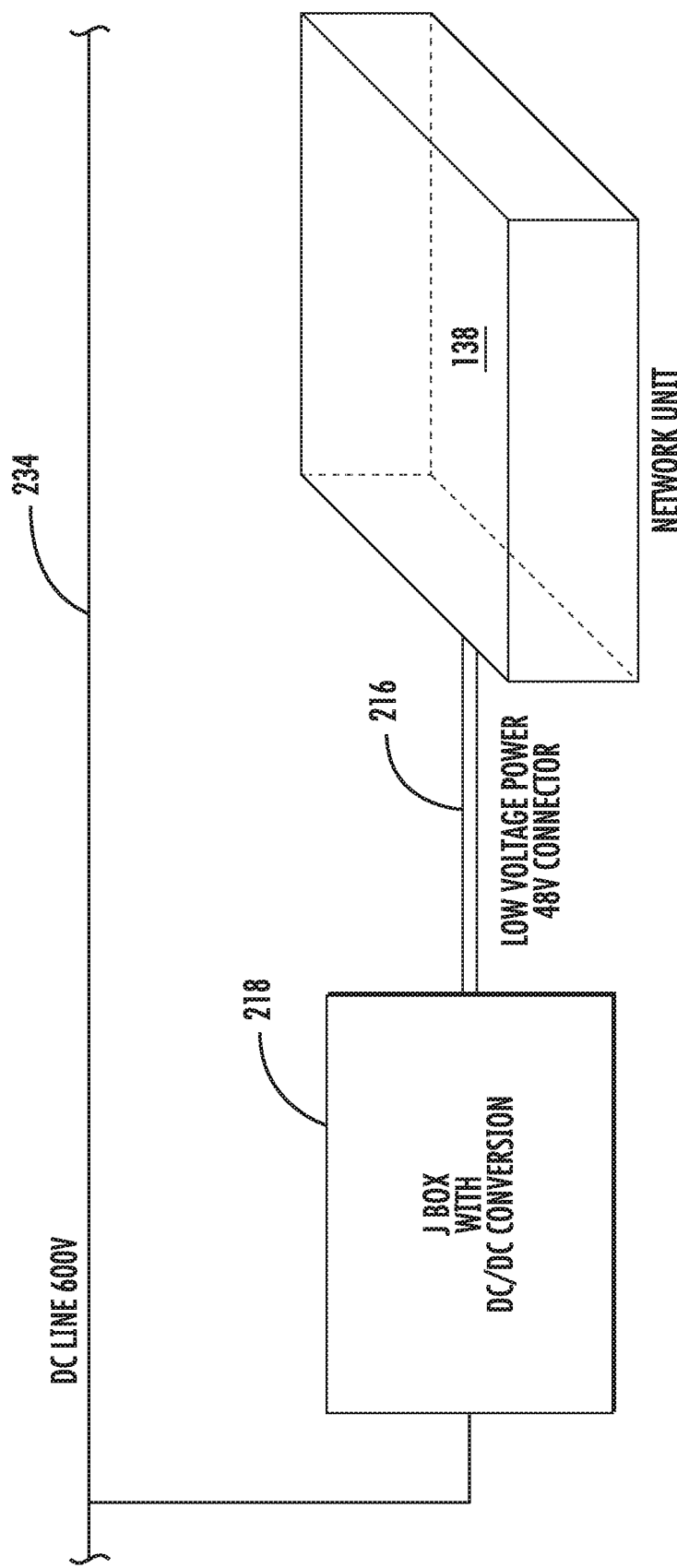
Figure 19:
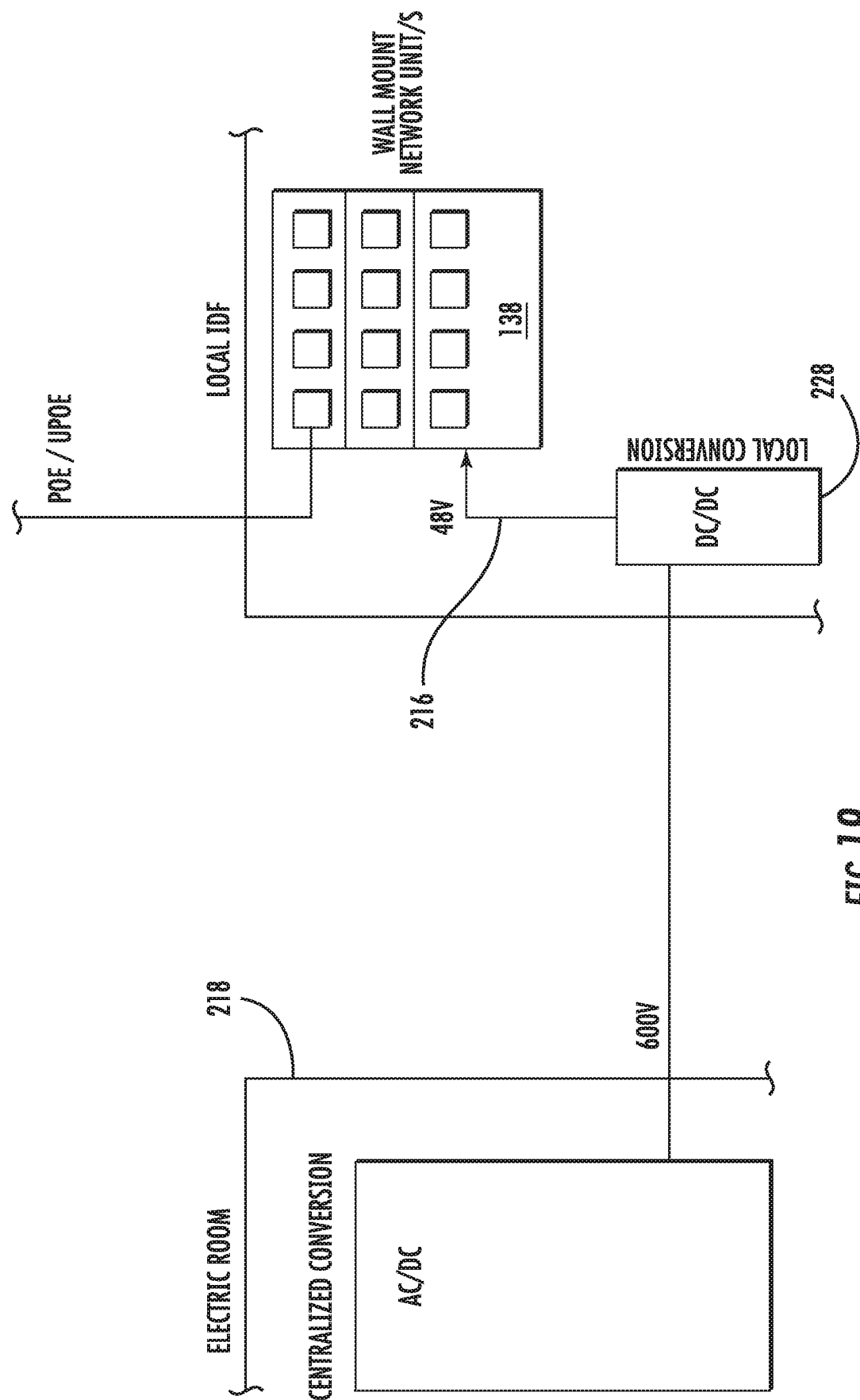
Figure 20:
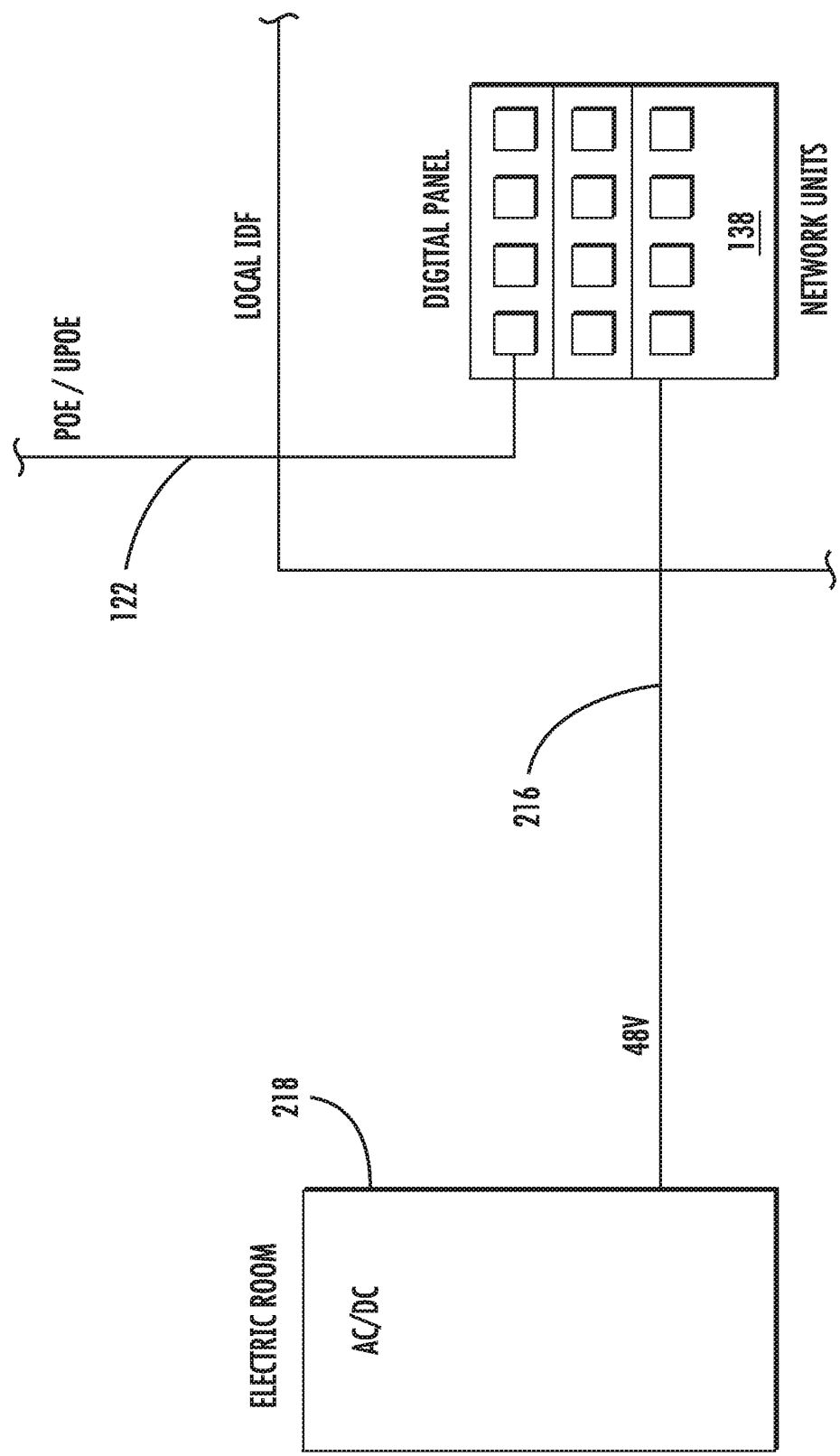

FIGS. 16-20 are block diagrams of various power supply scenarios to the low voltage network. In FIG. 16, a junction box 228 can connect a DC line 230 remotely to the network switch 138 for supplying power to the network switch 138. In FIG. 17, the junction box 228 can include an AC/DC convertor to convert an 110V AC power supply to 48V DC for inputting power to the network switch 138. In FIG. 18, the junction box 228 can include a DC/DC converter for converting a 600V DC power supply to 48V for inputting power to the network switch 138. In FIG. 19, the junction box 228 is located locally to the network switches 138, e.g., for converting 600V DC to 48V DC. In FIG. 20, 48V DC can be provided from the electrical room 218 to the network switches 138. Other implementations and voltages can be used for both line and input to the network switches 138.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

A person of skill in the art would readily recognize that steps of various described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The processing capability of the systems and processes described herein may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. The systems and methods can be implemented over a cloud.

Benefits, other advantages, and solutions to problems have been described herein with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

The detailed and, at times, very specific description herein is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

We claim:

1. A power over Ethernet (PoE) controller, comprising:
   an Ethernet port and first circuitry configured to support network signaling over an Ethernet network, wherein the first circuitry is configured to obtain PoE power from the Ethernet network;
   a device network interface that includes a device port and second circuitry configured to support network signaling over a non-Ethernet network, wherein the device port comprises a connector configured to support a wired harnesses connection, wherein the wired harnesses connection is a four-wire connection with two wires for power and two wires for signaling, and wherein the device network interface is configured to provide at least a portion of the PoE power from the first circuitry via the wired harnesses connection to a device;
   control circuitry, communicatively coupled to the first circuitry and the device network interface, configured to receive device control information via the first circuitry and to generate control instructions, that are more than requests for power, that are configured to control the device in response to the device control information for communication via the device network interface; and
   a power converter, electrically coupled to the Ethernet port and the control circuitry, the power converter configured to convert at least a portion of the PoE power to power for use by the control circuitry.

2. The power over Ethernet (PoE) controller of claim 1, wherein the Ethernet port comprises a connector configured to support an Ethernet cabling connection.

3. The power over Ethernet (PoE) controller of claim 2, wherein the connector configured to support an Ethernet cabling connection comprises an RJ45 connector.

4. The power over Ethernet (PoE) controller of claim 1, wherein the second circuitry is configured to support RS485 signaling.

5. The power over Ethernet (PoE) controller of claim 1, wherein the second circuitry is configured to support RS232 signaling.

6. The power over Ethernet (PoE) controller of claim 1, wherein the second circuitry is configured to support digital addressable lighting interface (DALI) signaling.

7. The power over Ethernet (PoE) controller of claim 1, wherein the second circuitry is configured to support Controller Area Network (CAN) signaling.

8. The power over Ethernet (PoE) controller of claim 1, wherein the second circuitry is configured to support BACnet signaling.

9. The power over Ethernet (PoE) controller of claim 1, wherein the second circuitry is configured to support universal asynchronous receiver/transmitter (UART) signaling.

10. The power over Ethernet (PoE) controller of claim 1, wherein the second circuitry is configured to support serial peripheral interface (SPI) signaling.

11. The power over Ethernet (PoE) controller of claim 1, wherein the device network interface comprises a device driver configured to perform at least one of conveying the control instructions to one or more devices corresponding to the control instructions and providing signaling for one or more devices to perform functionality corresponding to the control instructions.

12. The power over Ethernet (PoE) controller of claim 1, wherein the control circuitry is further configured to receive device information via the device network interface from one or more devices communicatively coupled to the device network interface and to generate communications in resonse to the received device information for transmission via the Ethernet port.

13. The power over Ethernet (PoE) controller of claim 1, wherein the device network interface is communicatively coupled to one or more devices to which the generated control instructions correspond.

14. The power over Ethernet (PoE) controller of claim 13, wherein the one or more devices comprise a dispenser is configured to dispense a least one of soap, towels, lotion, air, heated air, fragrance, sound, verbal instructions, information, communication from others, or warnings.

15. The power over Ethernet (PoE) controller of claim 13, wherein the one or more devices comprise a battery configured to power at least one of emergency lighting, a displace device, a sensor, or a beacon.

16. The power over Ethernet (PoE) controller of claim 13, wherein the one or more devices comprises a door lock, a window lock, or an electronic device lock.

* * * * *